3,524,885
PROCESS FOR THE PRODUCTION OF BENZALDEHYDES
Adolph J. Deinet, Woodcliff Lake, N.J., assignor to Tenneco Chemicals, Inc., a corporation of Delaware
No Drawing. Filed Dec. 26, 1967, Ser. No. 693,063
Int. Cl. C07c 47/54
U.S. Cl. 260—599                    9 Claims

ABSTRACT OF THE DISCLOSURE

In an improved process for the production of benzaldehyde and halogenated benzaldehydes, the appropriate benzal chloride is hydrolyzed in the presence of zinc phosphate at a temperature in the range of 130° to 135° C. In a preferred embodiment of the process, zinc oxide and phosphoric acid are added to the benzal chloride and the zink phosphate catalyst is formed in situ during the course of the hydrolysis reaction.

---

This invention relates to a process for the production of aromatic aldehydes. More particularly, it relates to a process for the production of benzaldehyde and nuclear-halogenated benzaldehydes by the hydrolysis of the appropriate benzal chloride in the presence of a substantially water-insoluble zinc salt of an organic or inorganic acid.

Benzaldehyde may be produced commercially by a procedure that involves the side-chain chlorination of toluene to form benzal chloride ($\alpha,\alpha$-dichlorotoluene) and the subsequent hydrolysis of the benzal chloride in the presence of an acidic or alkaline hydrolysis catalyst. When benzal chloride is treated with hot water or steam in the absence of a catalyst or in the presence of catalytic amounts of acetic acid, calcium hydroxide, or calcium carbonate, hydrolysis takes place very slowly even at elevated temperature, and often does not reach completion. When a water-soluble zinc salt, such as zinc chloride, is used as the catalyst, the hydrolysis takes place at a satisfactory rate. The zinc chloride catalyst, however, is sensitive to water and is deactivated by the presence of unreacted water or steam in the reaction vessel. When this deactivation of the zinc chloride catalyst occurs, the reaction either stops or proceeds very slowly until fresh catalyst is added. In addition, when a zinc chloride catalyst is used, considerable amounts of tar are formed during the hydrolysis of the benzal chloride.

In accordance with the present invention, it has been found that when the hydrolysis of benzal chloride or a nuclear-halogenated benzal chloride is carried out in the presence of a substantially water-insoluble zinc salt, such as zinc phosphate, the hydrolysis takes place at a readily controlled rate at moderate temperatures. Because the zinc phosphate catalyst is not deactivated by water, the rate at which the benzal chloride is hydrolyzed in the presence of this catalyst is not affected by the presence of unreacted water or steam in the reaction mixture. In addition it has been found that less tar formation occurs during the hydrolysis of benzal chloride in the presence of zinc phosphate than when zinc chloride is used to catalyze the reaction.

While the process of this invention finds its principal use in the production of benzaldehyde, it can also be used to produce such halogenated benzaldehydes as o-chlorobenzaldehyde, p-chlorobenzaldehyde, 2,4-dichlorobenzaldehyde, 3,4-dichlorobenzaldehyde, o-bromobenzaldehyde, 2,4-dibromobenzaldehyde, o-iodobenzaldehyde, p-iodobenzaldehyde, and 2,4-diiodobenzaldehyde by the hydrolysis of the corresponding benzal chlorides.

Among the substantially water-insoluble zinc salts that can be used to catalyze the hydrolysis of benzal chlorides are zinc laurate, zinc stearate, zinc oxalate, zinc tartrate, zinc silicate, and the like. Zinc phosphate is the water-insoluble zinc salt that is ordinarily and preferably used in the practice of this invention. Because zinc phosphate is not now available commercially and because its preparation on a small scale is time-consuming and costly, it is generally preferred to add zinc oxide and phosphoric acid to the hydrolysis mixture and to form zinc phosphate in situ during the course of the hydrolysis reaction. The amounts of zinc oxide and phosphoric acid added are those that will react under the conditions of the hydrolysis to form the desired amount of zinc phosphate. If desired, a small excess of zinc oxide can be used. As used herein, the term "phosphoric acid" includes all forms of this acid, including orthophosphoric acid, metaphosphoric acid, hypophosphoric acid, polyphosphoric acid, and pyrophosphoric acid. Acid of about 85 percent concentration is preferably used in the practice of this invention.

The amount of the catalyst used is about 0.5 percent to 3.0 percent, and preferably 1.0 percent to 1.5 percent, based on the weight of the benzal chloride.

The hydrolysis of benzal chlorides by the process of this invention may be accomplished using procedures that are well known in the art. For example, steam or hot water may be passed into the reaction mixture which contains the benzal chloride and hydrolysis catalyst until the hydrolysis has been completed. Since hydrogen chloride is formed as a by-product of the reaction, the subsiding of the evolution of hydrogen chloride can be taken as an indication of the completion of the hydrolysis. Following the neutralization of the hydrolyzed reaction mixture and its filtration to remove the catalyst, there is obtained a crude benzaldehyde product that contains small amounts of reaction by-products including benzoic acid and chlorobenzaldehydes. Benzaldehyde is separated from this crude product by steam distillation and is then further purified by distillation through a fractionating column.

The hydrolysis reaction is generally carried out at a temperature in the range of about 120° to 140° C., and preferably at 130° to 135° C. At these temperatures the hydrolysis takes place rapidly at a rate that is controlled by the rate at which steam is introduced into the reactor. Higher temperatures can be used, but they do not provide any particular advantage. When lower temperatures are used, the hydrolysis reaction proceeds more slowly and may be difficult to control.

The rate at which steam or hot water is introduced into the reaction mixture is not critical and is that which will provide the desired rapid, readily-controlled hydrolysis reaction. In most mases, steam is added at the rate of about 2 parts by weight to 10 parts by weight per hour and preferably 5 parts by weight to 7 parts by weight per hour per 100 parts by weight of benzal chloride in the reaction mixture.

The invention is further illustrated by the examples that follow. In these samples all parts and percentages are parts by weight and percentages by weight.

EXAMPLE 1

A mixture of 400 parts of crude benzal chloride (benzal chloride content, 91.0 percent), 2.43 parts (0.03 mole) of zinc oxide, and 2.31 parts (0.02 mole) of 85 percent phosphoric acid was heated to 130°–135° C. Steam was passed into the reaction mixture at the rate of 20 to 25 parts per hour while the temperature of the reaction mixture was maintained at 130°–135° C. Hydrogen chloride evolution began almost immediately. Steam sparging was continued until about 30 minutes after the evolution of hydrogen chloride had ceased to insure completion of the hydrolysis. The reaction mixture was cooled to 30° C., neutralized to pH 8.0 with dilute sodium carbonate solution, and filtered. There was obtained 242 parts of an oil phase, which contained 89.7 percent of benzaldehyde. This crude benzaldehyde was steam distilled and then distilled through a fractionating column to give substantially pure benzaldehyde.

The conversion of benzal chloride to benzaldehyde by this procedure was 90.6 percent.

EXAMPLE 2

A mixture of 550 parts of crude benzal chloride (benzal chloride content, 94.7 percent) and 5.5 parts of zinc phosphate was heated at 130°–135° C. while steam was passed through it at the rate of 20 to 25 parts per hour. The hydrolyzed reaction mixture was cooled to 30° C., neutralized to pH 8.0 with dilute sodium carbonate solution, and filtered. There was obtained 320 parts of an oil phase which contained 97.1 percent of benzaldehyde. This crude benzaldehyde was steam distilled and then distilled through a fractionating column to give substantially pure benzaldehyde.

The conversion of benzal chloride to benzaldehyde by this procedure was 90.7 percent.

The procedures described in Examples 1 and 2 can also be used to convert each of the aforementioned halogenated benzal chlorides to the corresponding halogenated benzaldehyde.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. In the process for the production of benzaldehydes by the hydrolysis of benzal chlorides having the structural formula:

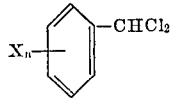

wherein X represents a halogen atom and $n$ represents an integer in the range of zero to two, at a temperature in the range of about 120° to 140° C., the improvement that comprises carrying out the hydrolysis in the presence of about 0.5 percent to 3.0 percent, based on the weight of benzal chloride, of a water-insoluble zinc salt selected from the group consisting of zinc phosphate, zinc laurate, zinc stearate, zinc oxalate, zinc tartrate, and zinc silicate.

2. The process of claim 1 wherein the hydrolysis catalyst is zinc phosphate.

3. The process of claim 2 wherein the hydrolysis catalyst is added to the reaction mixture as a mixture of zinc oxide and phosphoric acid.

4. The process of claim 2 wherein 1.0 percent to 1.5 percent, based on the weight of the benzal chloride, of the catalyst is used.

5. The process of claim 1 wherein the hydrolysis reaction is carried out at a temperature in the range of 130° to 135° C.

6. The process for the production of benzaldehyde that comprises the following steps:

(a) forming a reaction mixture containing benzal chloride, zinc oxide, and phosphoric acid, said zinc oxide and phosphoric acid being present in amounts that will react under the conditions of the subsequent hydrolysis to form about 0.5 percent to 3.0 percent, based on the weight of the benzal chloride, of zinc phosphate;

(b) heating said reaction mixture to a temperature in the range of about 120° to 140° C.; and (c) passing steam into said reaction mixture at such a rate that the reaction temperature is maintained in the range of about 120° to 140° C. until the evolution of hydrogen chloride ceases, thereby obtaining a product comprising benzaldehyde.

7. the process of claim 6 wherein the amounts of zinc oxide and phosphoric acid in the reaction mixture are those that will provide 1.0 percent to 1.5 percent, based on the weight of the benzal chloride, of zinc phosphate.

8. The process of claim 6 wherein the hydrolysis is carried out at a temperature in the range of 130° to 135° C.

9. The process of claim 6 wherein the hydrolysis product is distilled to yield benzaldehyde.

References Cited

UNITED STATES PATENTS

| 2,816,144 | 12/1957 | Harris | 260—599 |
| 3,087,967 | 4/1963 | Graham et al. | 260—599 |

FOREIGN PATENTS

| 2,878 | 7/1880 | Great Britain. |

BERNARD HELFIN, Primary Examiner